United States Patent [19]

Kashigi

[11] 4,218,711
[45] Aug. 19, 1980

[54] SPECIAL EFFECT DEVICE FOR ELECTRONICALLY ACCOMPLISHING A GRADUAL SCENE SHIFT

[75] Inventor: Kazuo Kashigi, Tokyo, Japan

[73] Assignee: Nippon Electric Company, Ltd., Tokyo, Japan

[21] Appl. No.: 38,129

[22] Filed: May 11, 1979

[30] Foreign Application Priority Data

May 12, 1978 [JP] Japan .................................. 53/56757

[51] Int. Cl.$^2$ ............................................. H04N 5/22
[52] U.S. Cl. ................................................. 358/183
[58] Field of Search ........................ 358/181, 182, 183

[56] References Cited

U.S. PATENT DOCUMENTS

| 3,821,468 | 6/1974 | Busch .................................. 358/183 |
| 4,101,930 | 7/1978 | Sanders et al. ....................... 358/183 |

Primary Examiner—Robert L. Richardson

Attorney, Agent, or Firm—Hopgood, Calimafde, Kalil, Blaustein & Lieberman

[57] ABSTRACT

In an electronic special video effect device, first and second digital video signals ($D_F$ and $D_S$) derived during a keying interval of time from two television signals (VA and VB) between the beginning and a switching instant of each predetermined period and between the switching instant and the end of the period, respectively, are written in a memory (35) in addresses corresponding to the respective periods starting at an initial address corresponding to the switching instant. Each period may be a horizontal or a vertical scanning period. The memory addresses are merely cyclically read out to provide an output signal (VD) that enables a scene represented by one of the television signals to be pushed away from a television screen by another scene represented by the other, leftwards, rightwards, downwards, or upwards. Read-out may be started at the initial address with write-in carried out merely cyclically. Both may start at the initial address.

1 Claim, 17 Drawing Figures

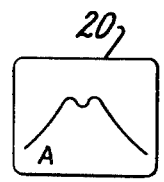 (PRIOR ART) FIG. 1(a)
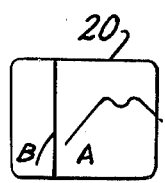 (PRIOR ART) FIG. 1(b)
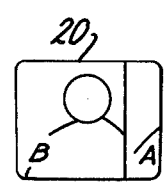 (PRIOR ART) FIG. 1(c)
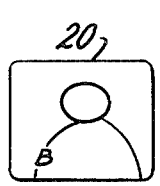 (PRIOR ART) FIG. 1(d)
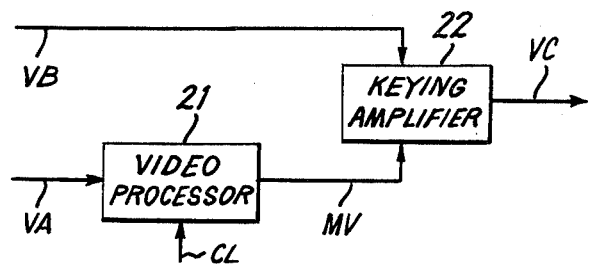 (PRIOR ART) FIG. 2
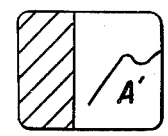 (PRIOR ART) FIG. 3

SPECIAL EFFECT DEVICE FOR ELECTRONICALLY ACCOMPLISHING A GRADUAL SCENE SHIFT

BACKGROUND OF THE INVENTION

This invention relates to a device for accomplishing, on a television screen, a special video effect such that a present scene is gradually shifted into another scene. The special effect like this will hereinafter be called gradual scene shifts in the instant specification for brevity of description.

Formerly, gradual scene shifts were optically carried out by the use of a film. A special video effect device has recently been proposed, wherein the gradual scene shifts are electronically carried out with the help of a random access memory for storing one of the scenes and a mixing circuit for mixing the stored scene with another scene. The electronical scene shifts are useful as compared with the optical scene shifts in view of rapidity of reproduction. As will later be described with reference to several figures of the accompanying drawing, the device is, however, inconvenient because the gradual scene shift is achieved by moving only one of the scenes. It is possible to move both scenes if a special effect device is provided with another random access memory at the cost of a much increased expense. Therefore, the device is inevitably expensive.

SUMMARY OF THE INVENTION

It is therefore an object of this invention to provide a special video effect device for electronically accomplishing gradual scene shifts, which is capable of moving both scenes at less expense.

It is another object of this invention to provide a special effect device of the type described, which is capable of carrying out the gradual scene shifts with a pair of scenes moving on a television screen.

It is still another object of this invention to provide a special effect device of the above-mentioned type, wherein the scene pair is horizontally moving during the gradual scene shifts.

It is yet another object of this invention to provide a special effect device of the type described, wherein the scene pair is vertically moving during the gradual scene shifts.

A special video effect device to which this invention is applicable is for electronically accomplishing a special video effect in response to first and second video signals phase-locked to each other. The device includes switching signal producing means operable during a predetermined interval of time substantially equal to a plurality of predetermined periods for producing a switching signal indicative of a switching instant variable between the beginning and the end of each of the predetermined periods and a keying circuit responsive to the first and the second video signals and the switching signal for keying the first and the second video signals to produce a third video signal that comprises a predetermined one of the first and the second video signals alone before the predetermined interval, repeatedly the first and the second video signals between the beginnings and the switching instants of the respective ones of the predetermined periods and between the switching instants and the ends of the respective ones of the predetermined periods, respectively, and the other of the first and the second video signals alone after the predetermined interval. According to this invention, the special effect device comprises converter means coupled to the keying circuit for converting the third video signal to a sequence of digital video signals with the first and the second video signals, those contained in said third video signal inclusive, converted to first and second digital video signals, respectively, a random access memory having a plurality of memory addresses specifiable by numbers corresponding to consecutive integers starting at a first of the memory addresses and ending at a second of the memory addresses in a predetermined one of an ascending and a descending order, the memory addresses between the first and the second addresses, inclusive, being made to correspond to each of the predetermined periods, one of the memory addresses consequently corresponding to the switching instant in each of the predetermined periods, means for producing write-in address signals that specify the respective ones of the memory addresses cyclically from the first address consecutively to the second address, means for producing read-out address signals that specify the respective ones of the memory addresses cyclically from the first address consecutively to the second address, means for supplying the first and the second digital video signals from the converter means to the memory, write-read means coupled to the memory and the write-in and the read-out address signal producing means for making said memory memorize the first and the second digital video signals in the memory addresses specified by the respective ones on the write-in address signals and produce an output signal comprising the first and the second video signals memorized in the memory addresses specified by the respective ones of the read-out address signals, and control means operatively coupled to the switching signal producing means and the write-in and the read-out address signal producing means for controlling a predetermined at least one of the write-in and the read-out address signal producing means to make the address signals produced by the predetermined address signal producing means start at said one address.

BRIEF DESCRIPTION OF THE DRAWING

FIGS. 1(a) through 1(d) are for illustrating an aspect of gradual scene shifts;

FIG. 2 is a block diagram of a conventional special effect device for accomplishing the gradual scene shift illustrated in FIG. 1;

FIG. 3 is for illustrating operation of a video processor used in the device illustrated in FIG. 2;

Figure 4A:
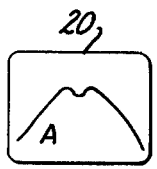
FIGS. 4(a) through 4(d) are for illustrating a gradual scene shift to be accomplished by a special video effect device according to this invention.
Figure 4B:
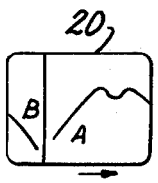
Figure 4C:
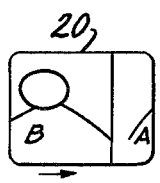

DESCRIPTION OF THE PREFERRED EMBODIMENTS:

Referring to FIGS. 1(a) through 1(d), a first scene A illustrated in FIG. 1(a) is horizontally shifted on a television screen 20 into a second scene B illustrated in FIG. 1(d). As the first scene A moves rightwards, the right hand portion thereof gradually disappears and, instead, the left hand portion of the second scene B appears from the left hand area of the television screen 20, as shown in FIGS. 1(b) and 1(c). The further movement of the first scene A results in the television screen 20 full of the second scene B, as shown in FIG. 1(d). It is noted here that the second scene B remains still in the gradual scene shift.

Referring to FIGS. 2 and 3, description will be made of a conventional special effect device for accomplishing the gradual scene shift illustrated with reference to FIG. 1 in order to facilitate an understanding of this invention. As shown in FIG. 2, the conventional special effect device is supplied with first and second television signals VA and VB from a well-known device (not shown) in a phase-locked manner to produce a third television signal VC. The first and the second television signals VA and VB are representative of the first and the second scenes A and B shown in FIGS. 1(a) and 1(d), respectively, and the third television signal VC, a scene composed of the first scene A and the second scene B as shown in FIG. 1(b) or 1(c). The special effect device comprises a video processor 21 for producing a modified video signal MV representative of a modified first scene A' (FIG. 3) in response to the first television signal VA and a control data signal CL supplied from a control panel (not shown). The control data signal CL is for gradually controlling the position of the first scene A on the television screen 20. The modified first scene A' thus moves rightwards. Use is possible, as the video processor, of a phase locking system disclosed by Masao Inaba et al in U.S. Pat. No. 4,007,486. According to Inaba et al, the video processor 21 comprises a random access memory for storing the first television signal VA in the form of a sequence of digital video signals. The random access memory should have a capacity sufficient to store the digital video signals for one field of a television signal. Intricate address control of the random access memory is required in response to the control data signal CL. In addition, the random access memory is indispensably provided with an analog-to-digital and a digital-to-analog converter. Accordingly, the video processor 21 is very expensive.

The special effect device further comprises a keying amplifier 22 responsive to the second television signal VB and the modified video signal MV for producing the third television signal VC. More particularly, the keying amplifier 22 selectively passes through the first and second television signals VA and VB as the third television signal VC. As a result, the first and the second scenes A and B are reproduced at desired areas, respectively, of the television screen 20. The device enables the gradual scene shift to be accomplished by moving the first scene A alone. In other words, the second scene B is stationary on the screen 20.

Figure 4D:
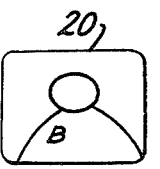

Temporarily referring to FIGS. 4(a) through 4(d), a first scene A illustrated in FIG. 4(a) is gradually shifted on a television screen 20 into a second scene B illustrated in FIG. 4(d) as is the case with the gradual scene shift illustrated with reference to FIG. 1. According to the gradual scene shift shown in FIG. 4, the second scene B appears from the right hand portion thereof on the television screen 20, as if the second scene B pushes out the first scene A rightwards. In other words, the second scene B also moves rightwards together with the first scene A as implied by two arrows in each of FIGS. 4(b) and 4(c).

Turning back to FIG. 2, another video processor similar to the video processor 21 is indispensable for moving the second scene B in order to accomplish the gradual scene shift illustrated with reference to FIG. 4. This shows the fact that the special effect device should be installed with a pair of video processors, each comprising a random access memory. Therefore, the special effect device becomes expensive as pointed out in the preamble of the instant specification.

Figure 5:
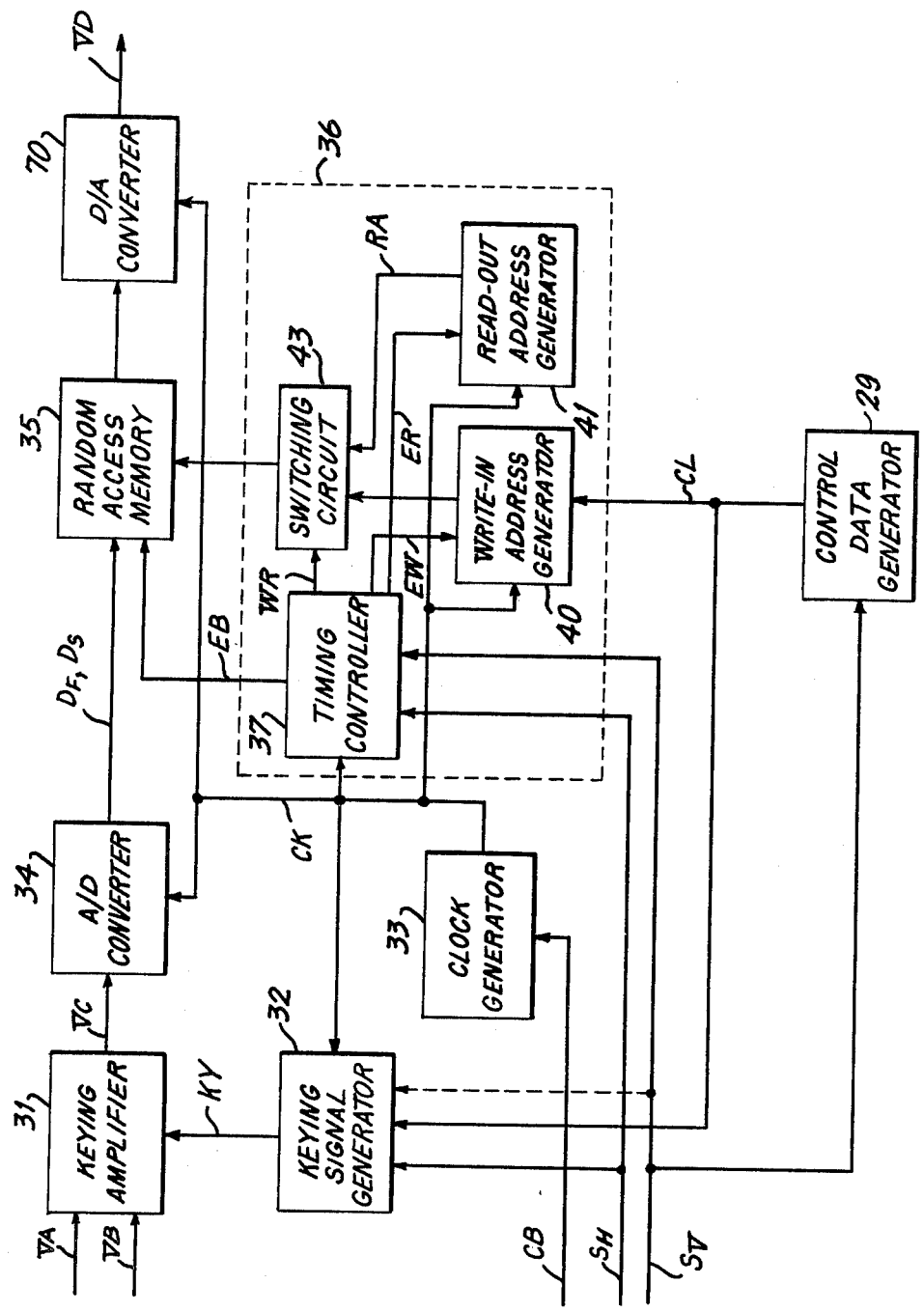
FIG. 5 is a block diagram of a special video effect device according to an embodiment of this invention.

Referring now to FIG. 5, a special video effect device according to a first embodiment of this invention is for accomplishing, by the use of a single random access memory, the gradual scene shift exemplified in FIG. 4. In the embodiment, mention is mostly made to the case where both the first scene A and the second scene B are horizontally shifted rightwards on a television screen 20 as described in conjunction with FIGS. 4(a) through 4(d). In other words, a switching line or position between the first and the second scenes A and B is moved rightwards. Herein, a distance from the left end to the right one of the screen 20 is represented by a width value M. The device illustrated in FIG. 5 is supplied with first and second television signals VA and VB of the NTSC system, together with a color subcarrier signal CB of about 3.58 MHz, a horizontal synchronizing signal $S_H$ of 15,750 Hz, and a vertical synchronizing signal $S_V$ of 60 Hz.

The device comprises a control data generator 29 responsive to the vertical synchronizing signal $S_V$ for producing a control data signal CL indicative of a distance value L from the left end of the screen 20 to the switching position. Inasmuch as the switching position appears between the left and the right ends, inclusive, the distance value L is between 0 and the width value M and decreases every time when a vertical synchronizing signal $S_V$ appears. The control data signal CL is supplied as a keying signal KY to a keying amplifier 31 through a keying signal generator 32 to be described later in detail. The keying signal KY is indicative of an instant corresponding to the switching position. Each of the control data signal CL, the distance value L, and the keying signal KY is variable between the beginning and the end of each of a plurality of predetermined periods of time repeated between a first and a second time instant. The predetermined period corresponds to the width value M and is now equal to a period between two adjacent horizontal synchronizing signals, i.e. 1/15,750 second. Strictly speaking, a horizontal blanking period and a color burst signal period are omitted from the predetermined period. The first and the second instants are instants of start and end of the gradual scene shifts, respectively.

As illustrated in FIG. 5, the keying amplifier 31 is supplied with the first and the second television signals VA and VB in addition to the keying signal KY. Use is possible, as the keying amplifier 31, of a television picture montage circuit disclosed by Yutaka Ito in U.S. Pat. No. 3,619,495. Generally, the keying amplifier 31 is capable of optionally passing through one of two television signals in accordance with the keying signal KY, as described by Ito. Therefore, each of the two television signals VA and VB may be placed either between the beginning of the predetermined period and the switching instant or between the switching instant and the end of the predetermined period. It may be mentioned here that they are called a first and a second video signal when placed between the beginning and the switching instant and between the switching instant and the end, respectively, during the gradual scene shift. For simplification of description, it is assumed that the first television signal VA corresponds to the first video signal while the second television signal VB, to the second video signal. This means that the first and the second scenes A and B are horizontally moved rightwards in the manner described in connection with FIGS. 4(a) through 4(d), as will explicitly be described hereinafter. From the above, it is readily understood that the keying amplifier 31 produces, as a third video or television signal VC, the first television signal or first video signal VA alone prior to the gradual scene shift or the first time instant, the first and the second video signals during the gradual scene shift, and the second television signal or second video signal CB alone after the gradual scene shift or the second time instant.

Figures 6, 11:
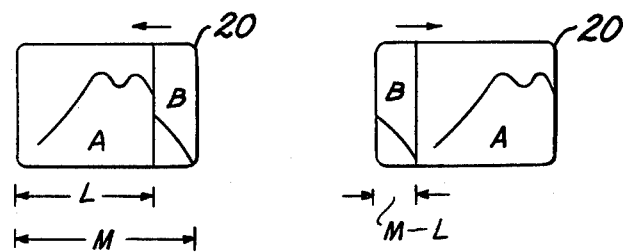
FIG. 6 is a view for illustrating a picture made by an output video signal of a keying amplifier for use in the device depicted in FIG. 5.
FIG. 11 is a view for illustrating a picture made by an output signal of the special video effect device according to this invention.

Temporarily referring to FIG. 6, an unpleasant picture would be reproduced on a television screen 20 from the third video signal VC during the gradual scene shift. The picture is depicted between the left and the right ends corresponding to the beginning and the end of the predetermined period, respectively, with the switching position shown between the left and the right ends. It should be noted here that the picture is a combination of the left hand portion of the first scene A illustrated in FIG. 4(a) and the right hand portion of the second scene B illustrated in FIG. 4(d). This is because the first video signal VA is derived at first as the third video signal VC and is followed by the second video signal VB. Therefore, the first video signal VA appears between the left end and the switching position, namely, between the beginning and the switching instant during each of the predetermined periods while the second video signal VB, between the switching position and the right end or between the switching instant and the end in each of the predetermined periods.

Referring back to FIG. 5, the device further comprises a clock pulse generator 33 responsive to the color subcarrier signal CB for producing a sequence of clock pulses CK of about 14.3 MHz. Supplied with the clock pulses CK and the third video signal VC, an analog-to-digital converter 34 converts the picture information contained in the third video signal VC into a sequence of digital video signals. The sequence contains first and second digital video signals $D_F$ and $D_S$ derived from the first and second video signals VA and VB, respectively. Each digital video signal may be a bit-parallel code of eight bits.

The digital video sequence $D_F$-$D_S$ is successively supplied to a random access memory 35 selectively operable in a write-in and a read-out mode. In the example being illustrated, the random access memory 35 has a capacity of 768×242×2×8 bits. This capacity corresponds to a quantity of the digital video signals for one frame (picture frame) of the NTSC system television signal including two fields. More particularly, the random access memory 35 has "horizontal" addresses, 768 in number, consecutively numbered from "0" to "767" and "vertical" addresses, 242×2 in number, consecutively numbered from "0" to "483." Any one of the addresses is accessible by the use of address signals specifying one of the horizontal addresses together with one of the vertical addresses. The number of the horizontal addresses is selected in accordance with the number of cycles of the clock pulses CK between two horizontal synchronizing signals with the horizontal blanking and the color burst periods omitted therefrom. The number of the vertical addresses is determined in consideration of the number of the horizontal scanning lines carrying the picture information in each frame with vertical blanking periods omitted therefrom. The minimum address "0" corresponds to the beginning of the predetermined period and the maximum address "767," to the end of the predetermined period. It is possible to understand that the addresses between the minimum and the maximum addresses, inclusive, correspond to each of the predetermined period. One of these addresses consequently corresponds to the switching instant in each of the predetermined periods.

Further referring to FIG. 5, the device comprises an address controller 36 for supplying the random access memory 35 with address signals which repeatedly or cyclically specify the addresses and comprises a timing controller 37, responsive to the horizontal and the vertical synchronizing signal $S_H$ and $S_V$ and the clock pulses CK, for producing an enable signal EB, a pair of energizing pulses EW and ER, and a mode indication signal WR. The enable signal EB serves to enable the random access memory 35 during the predetermined periods. The mode indication signal WR is indicative of one of a write-in and a read-out mode at a time for the random access memory 35. Control of the mode indication signal WR is carried out in a predetermined manner as described in the above-referenced U.S. Pat. No. 4,007,486 (Inaba et al).

The address controller 36 further comprises write-in and read-out address generator 40 and 41 for producing write-in and read-out address signals WA and RA, respectively, in response to the clock pulses CK and the respective energizing pulses EW and ER. The write-in and the read-out address signals WA and RA specify a portion of the addresses to be written in and another portion to be read out, respectively. The read-out address generator 41 may be similar to a read-out counter described in the above-referenced Inaba et al patent. Contrary to a write-in counter in the referenced patent, the write-in address generator 40 carries out address control peculiar to this invention, as will be described later.

A write-read switching circuit 43 is coupled to the timing controller 37, the write-in address generator 40, and the read-out generator 41, and supplies the write-in and the read-out address signals WA and RA to the random access memory 35 in a time shared fashion in response to the mode indication signal WR. As a result, the random access memory 35 memorizes the first and the second digital signals $D_F$ and $D_S$ in the memory addresses specified by the respective ones of the write-in address signals WA. Furthermore, the memory 35 produces an output signal comprising the first and the second digital video signals DF and DS memorized in the memory addresses specified by the respective ones of the read-out address signals.

Figure 7:
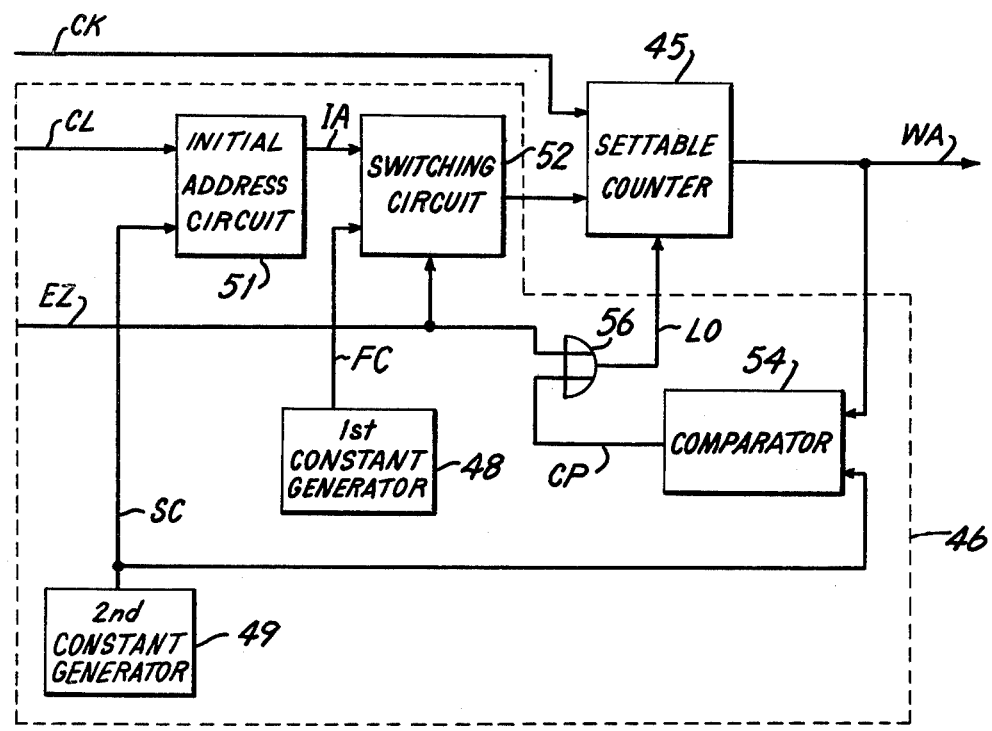
FIG. 7 is a block diagram of a write-in address generator for use in the device illustrated in FIG. 5.

Referring again to FIG. 5 and afresh to FIG. 7, the write-in address generator 40 is coupled to the control data generator 29, the timing controller 37, and the write-read switching circuit 43 and comprises a portion depicted in FIG. 7 for producing write-in address signals indicative of horizontal addresses of the random access memory 35 to carry out the peculiar address control. The illustrated portion comprises a settable counter 45 for counting the clock pulses CK to produce the write-in address signal WA and an address control section 46 responsive to the control data signal CL and the energizing pulse EW for controlling the write-in address signal WA. The address control section 46 comprises first and second constant generators 48 and 49 for producing first and second constant signal FC and SC representative of first and second constant value equal to a minimum and a maximum address number or "0" and "767," respectively, of which the latter address will be designated by M. The address control section 46 further comprises an initial address circuit 51 supplied with the control data signal CL and the second constant signal SC. It should be recollected here that the control data signal CL is indicative of the distance value L from the left end of the screen 20 to the switching position. Further, it is readily understood that the distance value L corresponds to a preselected one of the memory addresses between zero and M, inclusive. From the distance or preselected address L and the maximum address M, the initial address circuit 51 calculates an initial address represented by M−L to produce an initial address signal IA. The initial address circuit 51 may be a subtractor which subtracts the preselected address L from the maximum address M. The control data signal CL is thus converted into the initial address signal IA in the initial address circuit 51. The initial address signal IA is supplied to a switching circuit 52 together with the first constant signal FC. Responsive to the energizing pulse EW, the switching circuit 52 selects the initial address signal IA only in the presence of the energizing pulse EW and the first constant signal FC during absence thereof to supply to the settable counter 45 a selected signal SS representative of a selected one of the initial address and the first constant. The address control section 46 further comprises a comparator 54 responsive to the write-in address signal WA and the second constant signal SC for comparing the specified write-in address with the maximum address M to produce a coincidence pulse CP when the specified address is coincident with the maximum address M. The energizing pulse EW and the coincidence pulse CP are supplied as a loading pulse LO through an OR gate 56 to the settable counter 45.

Responsive to the selected signal SS, the settable counter 45 is selectively set to the initial address value (M−L) or the minimum value 0 (zero) when the loading pulse LO is supplied thereto. In this example, the counter 45 successively counts the clock pulse CK to the maximum value in an ascending order after set to the initial address value (M−L) or the minimum value 0 by the loading pulse LO. Use is possible, as the settable counter 45, of SN 74LS163N manufactured and sold by Texas Instrument Co. Ltd. In practice, the write-in address generator 40 comprises another portion for producing write-in address signals for the vertical addresses of the memory 35 by counting the horizontal synchronizing signal. Such a portion is well-known in the art and consequently will not be described in detail.

Figure 8:
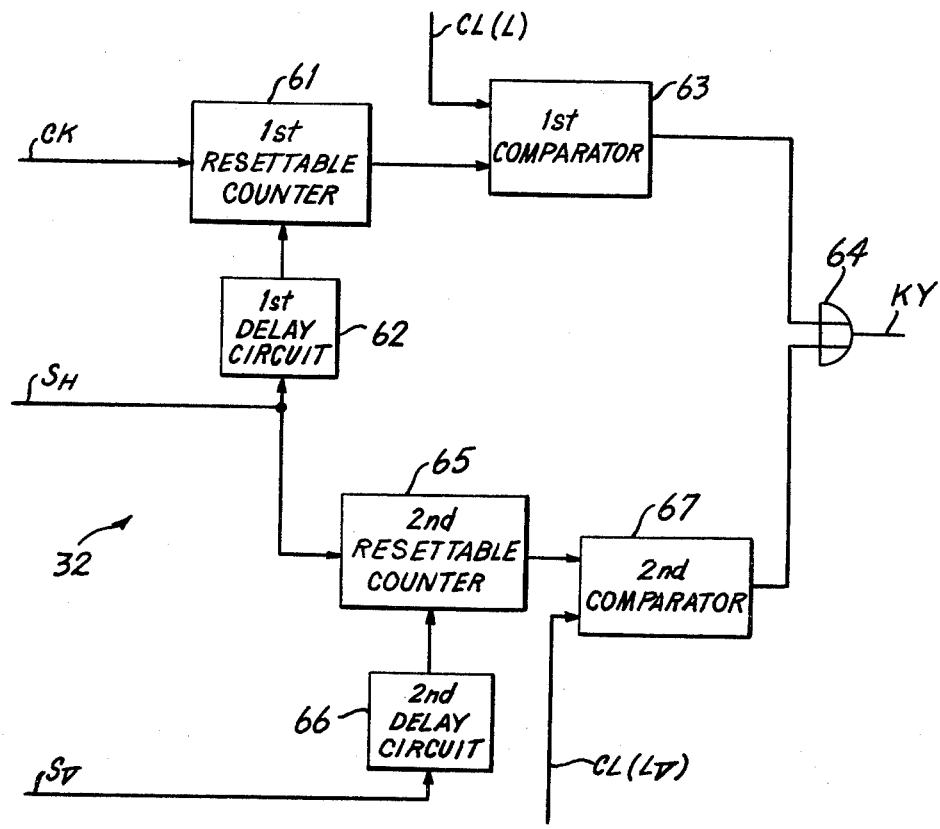
FIG. 8 is a block diagram of a keying signal generator for use in the device illustrated in FIG. 5.

Referring to FIG. 5 again and FIG. 8 afresh, the keying signal generator 32 comprises a first resettable counter 61 capable of counting the clock pulses CK. The first resettable counter 61 is reset after the horizontal blanking period by the horizontal synchronizing signal $S_H$ delayed by a delay circuit 62 and, thereafter, successively counts the clock pulses CK. The count in the counter 61 is supplied to a first comparator 63 in sequence to be compared with the distance value L represented by the control data signal CL. The comparator 63 produces, as the keying signal KY, a logic "1" signal when the count is less than the distance value L and a logic "0" signal after the count reaches the distance value L until the counter 61 is reset by the delayed horizontal synchronizing signal. The keying signal KY is supplied through an OR gate 64 to the keying amplifier 31 and serves to switch the first television signal VA to the second television signal VB, as described before. The switching position is variable with variation of the distance value L.

In the example being illustrated in FIG. 8, the keying signal generator 32 further comprises a second resettable counter 65 for counting the horizontal synchronizing signal $S_H$ after receiving the vertical synchronizing signal $S_V$ delayed by a delay circuit 66. A second comparator 67 compares the count in the counter 65 with a vertical distance value (depicted by $L_V$) representative of a vertical switching position. It is possible to vertically move the first and the second scenes A and B by the use of the second resettable counter 65, the delay circuit 66, and the second comparator 67.

Figures 9, 10:
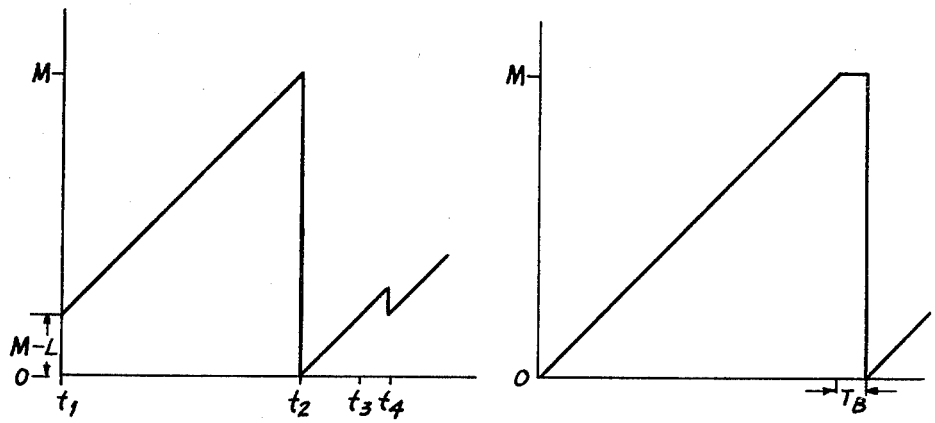
FIG. 9 is a view for illustrating operation of the write-in address generator depicted in FIG. 7.
FIG. 10 is a similar view for illustrating operation of another read-out address generator for use in the device shown in FIG. 5.

Referring to FIGS. 5 through 8 again and FIG. 9 afresh, description will be made of operation of the special effect device according to the first embodiment of this invention. The memory 35 is supplied with the digital video signals containing the first and the second digital video signals $D_F$ and $D_S$ between the beginning of the respective predetermined periods and the switching instant and between the switching instant and the end thereof, respectively. The memory 35 remains disabled by virtue of the enable signal EB during the color burst period, the horizontal blanking period, and the vertical blanking period. Supplied with the control data signal CL representative of the distance value L, the write-in address generator 40 is energized by the energizing pulse EW which is in timed relation to the enable signal EB. As a result, the initial address (M−L) calculated by the initial address circuit 51 passes through the switching circuit 52 to be set in the settable counter 45 in accordance with the loading pulse LO. The settable counter 45 produces the initial address (M−L) as the write-in address signal WA at the beginning of the predetermined period, indicated in FIG. 9 as a first instant $t_1$. The write-in address (M−L) is supplied through the write-read switching circuit 43 to the memory 35. A leftmost portion of the scene A illustrated in FIG. 6 is written in the (M−L)-th address of the memory 35. Since the counter 45 counts up the clock pulses CK, the write-in address value successively increases with the count. When the clock pulses CK are counted to L, the write-in address is rendered equal to the maximum address M. By this time, the scene A is memorized in the memory 35 from the left end of the screen 20 to the switching position. The comparator 54 supplies the coincidence pulse CP as the loading pulse LO to the counter 45 on the coincidence of the write-in address with the maximum address M. In this state, no energizing pulse EW is supplied to the switching circuit 52. Therefore, the first constant value 0 selected by the switching circuit 52 is set in the settable counter 45 in synchronism with the loading pulse LO. The write-in address is consequently turned to "0" at a second instant $t_2$. The settable counter 45 successively counts the clock pulses CK starting at the first constant value 0 to a third instant $t_3$, when the timing controller 37 makes the enable signal EB disable the memory write-in during the horizontal blanking period lasting from the third instant $t_3$ to a fourth instant $t_4$. The counter 45 may continuously count the clock pulses CK during the horizontal blanking period, as shown in FIG. 9. At the fourth instant $t_4$, the counter 45 is set to the initial address (M−L) again in response to the energizing pulse EW. Thereafter, like operation is repeatedly carried out during one field period with the distance value L kept constant. After one field period, the distance value L is somewhat decreased manually or automatically. With decrement of the distance value L, the switching position is shifted leftwards on the screen 20 as shown in FIG. 6 by an arrow to gradually reduce the area of the first scene A and to expand the area of the second scene B.

Referring to FIG. 5 again and FIGS. 10 and 11 afresh, the read-out address generator 41 is energized in the read-out mode by the energizing pulse ER to produce the read-out address signals RA indicative of read-out addresses. The read-out address generator 41 makes the address start at "0." Thereafter, the addresses successively increase to the maximum address M in response to the clock pulses CK, as shown in FIG. 10. Reaching the maximum address M, the read-out address value is kept at the maximum address M during the horizontal blanking period depicted at $T_B$. After the horizontal blanking period $T_B$, the read-out address value is returned to zero. Similar operation is repeated during one field period. This shows the fact that the second digital video signals $D_S$ are read out from the memory 35 prior to the first digital video signals $D_F$. Therefore, the second scene B and the first scene A appear between the left end of the screen 20 and the switching position and between the switching position and the right end, respectively, when the output signal is reproduced on the screen 20. As a result, the scene B gradually expands with an increase of M−L while the scene B reduces in area with the decrease of the distance value L, as suggested in FIG. 11 by an arrow. The read-out digital video signals are supplied from the memory 35 to a digital-to-analog converter 70 which is supplied with the clock pulses CK. The digital-to-analog converter 70 produces an output analog video signal VD with the color burst signal, and the horizontal and the vertical synchronizing signals reinserted therein.

It is possible to accomplish the similar special effect even if the address control section 46 is included in at least one of the write-in and the read-out address generators 40 and 41.

It is possible to gradually move the first and the second scenes A and B leftwards. In this case, the first and the second television signals VA and VB are derived at the keying amplifier as the second and the first video signals placed between the beginning of the predetermined period and the switching instant and between the switching instant and the end thereof, respectively. Moreover, the distance value L is gradually changed by the control data generator 29 to increase from zero to the maximum value M at every field period.

According to this invention, a vertical scene shift is also possible by providing the keying signal generator 32 and the write-in address generator 40 in FIG. 5 with the vertical distance value, instead of the distance value L, that is, horizontal distance value. Use is made of the second counter 65, the second delay circuit 66, and the second comparator 67 in the keying signal generator 32 to vertically move the scenes A and B. In addition, the settable counter 45 and the initial address circuit 51 may be supplied with the horizontal synchronizing signal $S_H$ and the vertical distance value $L_V$ represented by the control data signal CL, respectively.

While this invention has so far been described in conjunction with a few preferred embodiments thereof, it is readily possible for those skilled in the art to put the invention into practice in various manners. For example, the settable counter 45 may count the clock pulses CK from the initial address value M−L in a descending order to cause the picture as illustrated in FIG. 11 to be turned inside out.

What is claimed is:

1. A special video effect device for electronically accomplishing a special video effect in response to first and second video signals phase-locked to each other, including switching signal producing means operable during a predetermined interval of time substantially equal to a plurality of predetermined periods for producing a switching signal indicative of a switching instant variable between the beginning and the end of each of said predetermined periods and a keying circuit responsive to said first and said second video signals and said switching signal for keying said first and said second video signals to produce a third video signal that comprises a predetermined one of said first and said second video signals alone before said predetermined interval, repeatedly said first and said second video signals between the beginnings and the switching instants of the respective ones of said predetermined periods and between the switching instants and the ends of the respective ones of said predetermined periods, respectively, and the other of said first and said second video signals alone after said predetermined interval, wherein the improvement comprises:

converter means coupled to said keying circuit for converting said third video signal to a sequence of digital video signals with said first and said second video signals, those contained in said third video signal inclusive, converted to first and second digital video signals, respectively;

a random access memory having a plurality of memory addresses specifiable by numbers corresponding to consecutive integers starting at a first of said memory addresses and ending at a second of said memory addresses in a predetermined one of an ascending and a descending order, said memory addresses between said first and said second addresses, inclusive, being made to correspond to each of said predetermined periods, one of said memory addresses consequently corresponding to the switching instant in each of said predetermined periods;

means for producing write-in address signals that specify the respective ones of said memory addresses cyclically from said first address consecutively to said second address;

means for producing read-out address signals that specify the respective ones of said memory addresses cyclically from said first address consecutively to said second address;

means for supplying said first and said second digital video signals from said converter means to said memory;

write-read means coupled to said memory and said write-in and said read-out address signal producing means for making said memory memorize said first and said second digital video signals in the memory addresses specified by the respective ones of said write-in address signals and produce an output signal comprising the first and the second video signals memorized in the memory addresses specified by the respective ones of said read-out address signals; and control means operatively coupled to said switching signal producing means and said write-in and said read-out address signal producing means for controlling a predetermined at least one of said write-in and said read-out address signal producing means to make the address signals produced by the predetermined address signal producing means start at said one address.

* * * * *